US007331738B2

(12) United States Patent
Hofbrucker et al.

(10) Patent No.: US 7,331,738 B2
(45) Date of Patent: Feb. 19, 2008

(54) DRILL ADAPTER FOR A POWER SCREWDRIVER

(75) Inventors: Thomas Hofbrucker, Mammendorf (DE); Thomas Bader, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 402 days.

(21) Appl. No.: 11/053,380

(22) Filed: Feb. 8, 2005

(65) Prior Publication Data

US 2005/0191139 A1 Sep. 1, 2005

(30) Foreign Application Priority Data

Feb. 9, 2004 (DE) ..................... 10 2004 006 205

(51) Int. Cl.
*B23B 51/08* (2006.01)

(52) U.S. Cl. .................................. 408/239 A; 279/145

(58) Field of Classification Search ................ 408/124, 408/132, 134, 238–240; 7/158, 165; 279/143–145; 433/114, 126, 128, 129; 606/79, 80, 180
See application file for complete search history.

(56) References Cited

U.S. PATENT DOCUMENTS 2,536,017 A * 1/1951 Bamberger .................. 279/48
3,488,850 A * 1/1970 Brooks et al. .............. 433/129
3,631,597 A * 1/1972 Lieb et al. .................. 433/129
3,867,943 A * 2/1975 Nordin ....................... 606/180
3,973,784 A * 8/1976 Smith ......................... 279/144
5,110,145 A * 5/1992 Stewart ...................... 279/24
5,129,118 A * 7/1992 Walmesley .................... 7/158
5,224,230 A * 7/1993 Vanicsek et al. ............... 7/158
5,276,929 A * 1/1994 Mitchell ........................ 7/158
5,478,093 A * 12/1995 Eibl et al. ..................... 279/51
5,928,241 A * 7/1999 Menut et al. ................. 606/80
6,079,716 A * 6/2000 Harman et al. ............... 279/75
6,550,786 B2 * 4/2003 Gifford et al. ................ 279/75

* cited by examiner

*Primary Examiner*—Daniel W. Howell
(74) *Attorney, Agent, or Firm*—Abelman, Frayne & Schwab

(57) ABSTRACT

A drill adapter for a power screwdriver and including a locking device for releasably securing the drill adapter (28) on the support region (66) of the screwdriver (4) and having a push-on sleeve (30) supportable on the support region (66) and at least one engagement member (52) for releasably securing the push-on sleeve (30) on the support region, and an element for actuating the drive clutch (10) of the screwdriver (4) via the tool spindle (12) and projecting into a receiving space (38), which is partially limited by the push-on sleeve (30) and is open at one side, and having an axial stop (46) for engaging the tool spindle (12), with the at least one engagement member (52) projecting, in its locking position, beyond an inner surface (70) of the push-on sleeve (30) for establishing an axial formlocking connection between the push-on sleeve (30) and the support region (66) of the screwdriver (4) and which provides for actuation of the drive clutch (10) with actuating element.

5 Claims, 3 Drawing Sheets

DRILL ADAPTER FOR A POWER SCREWDRIVER

BACKGROUND OF THE INVENTION

1. Field of the Invention

The present invention relates to a drill adapter for a power screwdriver and having a locking device for releasably securing the drill adapter on the support region of the screwdriver and including a push-on sleeve supportable on the support region of the screwdriver and attachment means having a locking position in which the drill adapter is secured on the support region, and a release position in which the drill adapter can be mounted on or dismounted from the support region, with the attachment means having at least one engagement member supported in the push-on sleeve, a drill chuck for receiving a drilling tool and rotatable relative to the locking device and torque transmitting means for drivingly connecting the drill chuck with the tool spindle of the screwdriver.

2. Description of the Prior Art

Drill adapters of the type described above are used for expanding the function field of a pure screwdriver so that the screwdriver can also be used for drilling bores. E.g., it is possible to form guide bores in a workpiece, e.g., in a wood piece or a metal sheet, with a screwdriver equipped with a drill adapter of the type described above. After a bore is formed, the drill adapter is removed from the screwdriver, and the screwdriver can be used for screwing a screw in the formed bore.

U.S. Pat. No. 5,564,717 discloses a screwdriver adapter the push-on sleeve of which is so formed that it can be mounted over a depth stop which remains on the screwdriver. The locking device of the drill adapter includes an outer sleeve that displaceably retains the push-on sleeve and in which an adjusting or setting screw is arranged. For securing the drill adapter on the screwdriver, the setting screw is screwed relative to the depth stop as soon as a screw driving bit, which also remains in the screwdriver, engages in a screw head connected with the drill chuck.

The advantage of the known drill adapter consists in that both the screw driving bit and the depth stop remain in the screwdriver when the drill adapter is mounted on the screwdriver. This insures rapid mounting and dismounting of the drill adapter and a rapid change between the screwing and drilling functions of the screwdriver.

The drawback of the known drill adapter consists in that it is provided specifically for a screwdriver and is suitable only therefore. With this drill adapter, the screw driving bit, which remains in the screwdriver slightly projects beyond the depth stop or a front nose ring. Therefore, the application field of the known drill adapter is rather limited.

Furthermore, the connection between the drill adapter and the screwdriver is not sufficiently stable, which often results in malfunction during operation. Further, with the known torque transmission means, there exists a danger that upon mounting of the drill adapter on the screwdriver, the screw driving bit does not engage in the screw head correctly. This can result in damage. Moreover, when the drill adapter is mounted on the screwdriver, the outer sleeve must be brought with one hand in a certain position, in which the screw driving bit engages the screw head, and be held in this position. In this position of the outer sleeve, the adjusting or setting screw should be simultaneously tightened with another hand. Thus, none of the hand is free for holding the screwdriver. As a result, the mounting of the screwdriver is rather inconvenient.

An object of the invention is a drill adapter with which the foregoing drawbacks of the known drill adapter are eliminated.

Another object of the present invention is a drill adapter having a wide field of application and which can be handled much more easily than the known drill adapter.

SUMMARY OF THE INVENTION

These and other objects of the present invention, which will become apparent hereinafter, are achieved by providing a drill adapter of the type described above and which there is provided means for actuating the drive clutch via the tool spindle. The actuating means projects into a receiving space, which is partially limited by the push-on sleeve and is open at one side, and has an axial stop for engaging the tool spindle. The at least one engagement member, in a locking position of the attachment means, projects beyond the inner surface of the push-on sleeve for establishing an axial formlocking connection between the push-on sleeve and the support region of the screwdriver and which provides for actuation of the drive clutch with actuation means.

In many screwdrivers, the tool spindle only then becomes connected with its drive when the fastening element, which is being driven-in by the screwdriver, is pressed against a workpiece. With the drill adapter according to the present invention, the tool spindle is pushed axially against a biasing force relative to the housing and brings the drive clutch in its engagement condition already upon mounting of the drill adapter. In an unloaded condition, the drive clutch is disengaged as a result of a biasing force being applied to the tool spindle. The disengagement condition of the drive clutch in the unloaded condition is of an advantage during the screw driving process, as it insures actuation of the drive clutch only upon a reliable engagement of the screw-driving bit in the screw head. During a drilling process, contrary to the screw-driving process, a direct torque transmission is desirable. This is because a displaceable spindle in many cases leads to an uneven drilling of a workpiece, and a drill later can remain in a hole when the screwdriver is pulled out, which can lead to jamming and damage.

With the actuation means according to the present invention, the drill adapter can only be used with a screwdriver having the disengaged drive clutch in an unloaded condition.

Upon mounting of the inventive drill adapter, the support region of the screwdriver is received in the receiving space of the push-on sleeve, and the axial stop, which is provided on actuation means, contacts the tool spindle. Only upon further advancing the drill adapter over the support region, the axial stop displaces the tool spindle in the mounting direction, with the spindle displacing the drive clutch members into engagement with each other. The push-on sleeve can be brought into engagement with the support region of the screwdriver only by the engagement bodies. Because the axial stop is axially offset relative to the push-on sleeve, the drive clutch is firmly and stably held in an engagement condition by the formlocking connection between the push-on sleeve and the screwdriver. In this way, with the mounted drill adapter, direct driving of the spindle is achieved. Thereby, the drill adapter can be conveniently used with screwdrivers having a normally separated, drive clutch.

According to an advantageous embodiment of the present invention, the actuating means and the torque transmitting means are formed as a one-piece element in form of a drive rod. This permits to reduce the dimensions of the drill adapter and its manufacturing costs.

Advantageously, the drive rod has a thread end forming the torque transmitting means and screwable into a threaded opening provided in the drill chuck, and a shank forming the actuating means, having a polygon cross-section, and insertable in a bit receptacle of the tool spindle of the screwdriver. This insures a direct transmission of a torque from the tool spindle to the drill chuck. In addition, if necessary, the drill chuck can be easily replaced on the drive rod. Further, with the shank adapted to the bit receptacle, a simple and rapid mounting and dismounting of the drill adapter becomes possible.

Advantageously, the shank has an axially extending stop element having a cross-section which is smaller than the polygon cross-section of the shank and a free end of which forms the axial stop. Such a shank insures a reliable axial contact between the drive rod and the tool spindle which, in turn, insures a satisfactory displacement of the tool spindle and engagement of the drive clutch.

Alternatively, the drive rod can be provided with a transverse step between its threaded end and the shank. Upon mounting of the drill adapter, the transverse step can engage, e.g., an end surface of the tool spindle. Such a step permits to reduce the length of the drive rod, providing for a better handling of the drill adapter.

Advantageously, the push-on sleeve has at least one transverse opening in which the at least one engagement member is located and which has a length smaller than a length of the at least one engagement member in a direction toward the transverse opening. Such an arrangement insures an easy displacement of the engagement member from the contact surface and a stable formlocking connection of the drill adapter with the support region of the screwdriver.

It is particularly advantageous when the attachment means includes an adjusting body displaceable over an outer side of the push-on sleeve parallel thereto, and spring means for preloading the adjusting body to its locking position in which the adjusting body overlies the at least one transverse opening. Such an adjusting body insures, in simple manner, a firm formlocking connection between the drill adapter and the screwdriver.

It is particular advantageous when the adjusting body is formed as a ring-shaped body displaceable over the push-on sleeve and having an annual surface which limits an inner cone engageable with the at least one engagement member, and an axial spring located between the ring-shaped body and the push-on sleeve and displaceable over the push-on sleeve. With a such ring-shaped body, a particular stable formlocking connection can be obtained, and a jamming-free displacement of the adjusting body is insured. The ring-shaped body also insures a convenient holding of the drill adapter while the locking device is being actuated, which simplified to a large extent mounting of the drill adapter on the screwdriver.

Advantageously, the engagement member is formed as a ball. Therefore, jamming of the engagement member during its displacement can be prevented.

The present invention also relates to a drill adapter-power screwdriver assembly with a drill adapter according to the present invention and in which assembly, the tool spindle has a counter-stop cooperating with the axial stop of the actuating means, the supporting region has engagement means for partially receiving the engagement member projecting from the inner surface of the push-on sleeve, and an axial distance between the counter-stop and a center of the partially receiving engagement means, in an undisplaced position of the tool spindle, is greater than the axial distance between the axial stop of the actuating means and a center of the engagement member.

Because the counter-stop of the tool spindle is arranged in an operational direction of the screwdriver, in front of the receiving engagement means of the support region, upon mounting of the drill adapter, the axial stop of the drill adapter contacts the counter-stop before the engagement member is located at the axial height of the receiving engagement means. Thus, the tool spindle has already be displaced by some length before the engagement member engages in the receiving engagement means. This insures a reliable engagement of the drive clutch.

It is advantageous when the axial distance between the counter-stop and the receiving engagement means is about by from 3 mm to 7 mm greater than the axial distance between the axial stop and the at lest one engagement member. The difference in these distances is equal to the length of the displacement path and insures within this length region, a reliable engagement of the drive clutch.

Advantageously, the receiving engagement means is formed by an annular groove generally used for mounting of a depth stop, and a diameter of the at least one engagement member is adapted to a cross-section of the annual groove. This, on one hand, permits to reduce manufacturing costs and, on the other hand, insures a reliable formlocking connection.

Advantageously, the drive spindle has a drill receptacle, and the shank of the drive rod has a polygon cross-section dimensions and a shape of which are adapted to a receiving cross-section of the bit receptacle. This provides for a particularly good torque transmission.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
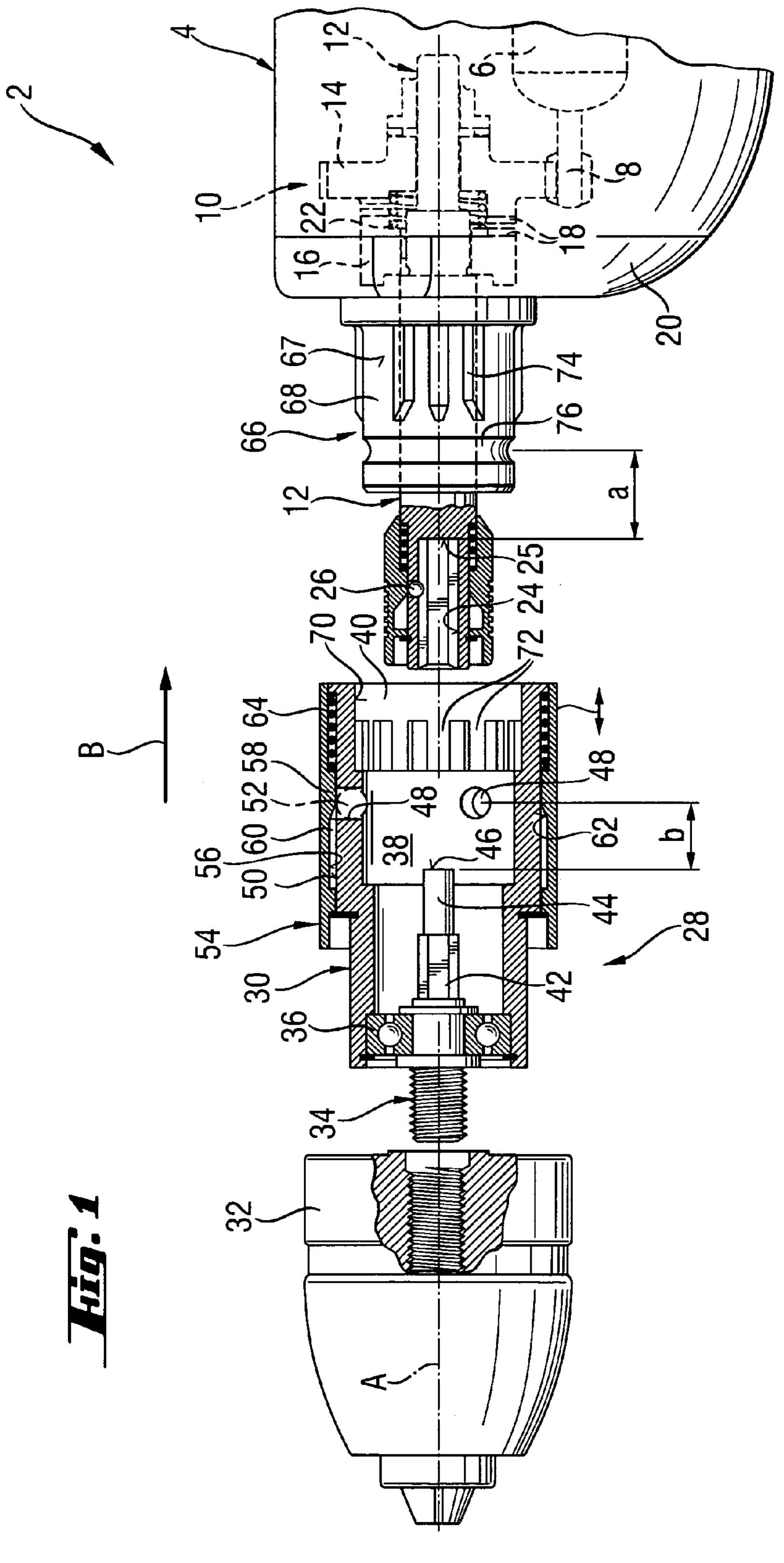
FIG. 1 an exploded, partially cross-sectional view of a drill adapter-power screwdriver assembly according to the present invention.

A drill adapter-power screwdriver assembly 2, which is shown in FIG. 1, includes a power screwdriver 4 which is formed as a constructional screwdriver with a tool side end relevant for the present invention an at which a tool bit (not shown) is mountable. The screwdriver 4 has a motor 6 which is shown with dash lines and which drives a tool spindle 12 via a driving pinion 8 and a drive clutch 10.

The drive clutch 10 has a first clutch member 14 rotably supported on the tool spindle 12 and cooperating with the driving pinion 8, and a second clutch member 16 fixedly connected with the tool spindle 12 for joint rotation therewith. Both clutch members 14 and 16 have claws 18 which, upon displacement of the second clutch member 16 toward and away from the first clutch member 14, are brought into engagement with each other. To this end, the tool spindle 12 is displaceably arranged in the housing 20 of the screwdriver 4. For disengagement of the drive clutch 10 in its normal, i.e., inloaded condition, there is provided between the first and second clutch members 14, 16 a helical spring 22 that biases the two clutch members 14 and 16 away from each other.

At its end remote from the drive clutch 10, the tool spindle 12 has a tool bit receptacle 24 having a hexagonal cross-section. The tool bit receptacle 24 is axially limited by a bottom 25. For securing a screw-driving bit (not shown), a locking ball 26 partially projects into the tool bit receptacle 24.

A drill adapter 28 is essentially formed of a push-on sleeve 30, a drill chuck 32, and a torque transmitting element in form of a drive rod 34. The drill chuck 32 is mountable on the drive rod 34 using thread connection means and, therefore, can be replaced at any time. A ball bearing 36 provides for rotation of the drive rod 34. However, the drive rod 34 is supported in the push-on sleeve 30 without a possibility of displacement along axis A.

The push-on sleeve 30 partially limits a receiving space 38 having an opening 40. The drive rod 34 projects into the receiving space 38 with its shank 42 that has a cross-section corresponding to a receiving cross-section of the tool bit receptacle 24. A stop element 44 projects from the shank 42 in a direction of the opening 40. The free end of the stop element 44 forms an axial stop 46. The stop element 46 has a cross-section of the shank 42 that is received in the tool bit receptacle 24.

On the push-on sleeve 30, there are provided three transverse openings 48 angularly spaced from each other by 120° and connecting radially the receiving space 38 with an outer circumference 50 of push-on sleeve 30. As shown with dash lines, the transverse openings 48 serve for receiving engagement members 52 which are formed as balls and the diameter of which is greater than the length of the openings 48.

On the outer circumference 50 of the push-on sleeve 30, there is arranged an actuation sleeve 54 that is pushed over the push-on sleeve 30 and is axially displaceably supported thereon. The inner circumference of the actuation sleeve 54 is provided with a ring-shaped adjusting body 58 that lies on the circumference 50 of the push-on sleeve 30. The adjusting body 58 has a locking position in which it is located at the axial height of the transverse opening 48 and is engageable with the engagement member 52, and a release position in which it is spaced axially from the transverse opening 48.

In the release position of the adjusting body 58, a disengagement space 60 of the actuation sleeve 54 is located at the axial height of the transverse opening 48. The disengagement space 60 is radially limited by the outer circumference 50 of the push-on sleeve 30 and by the inner circumference 56 of the actuation sleeve 54. At its axial end adjacent to the adjusting body 58, the disengagement space 60 is provided with an inclination annular surface 62 that limits a cone.

An axial spring 64 is provided between the push-on sleeve 30 and the actuation sleeve 54. The axial spring 54 biases the adjusting body 58 against the push-on sleeve 30 in the locking position of the adjusting body 58.

For securing the drill adapter 28 on the screwdriver 4, the push-on sleeve 30, which forms part of a locking device, is pushed over a support region 66 along a mounting direction B that is formed on an outlet surface 67 of a screwdriver neck 68. To this end, the receiving space 38 of the push-on sleeve 30 has dimensions and shape which adapted to those of the support region 66 of the neck 68. The receiving space 38 is provided on an inner surface 70 thereof with axial recesses 72 for receiving, upon mounting of the drill adapter 28 on the screwdriver 54, axial ribs 74 which are formed on the outer surface 67 of the screwdriver neck 68. Further, the outer surface 67 is provided with an annual groove 76 that normally serves for partially locking a depth stop. During securing of the drill adapter 28 on the screwdriver 4, the groove 76 is used for partially receiving the engagement members 52 of the push-on sleeve 30.

As shown in FIG. 1, the annular groove 76 is spaced, in an unloaded condition of the tool spindle 12, from the bottom 25 of the bit receptacle 24, by an axial distance a. The distance a is greater than an axial distance b between the axial stop 46 and a center of the engagement member 52 by 3-7 mm.

Figure 2:
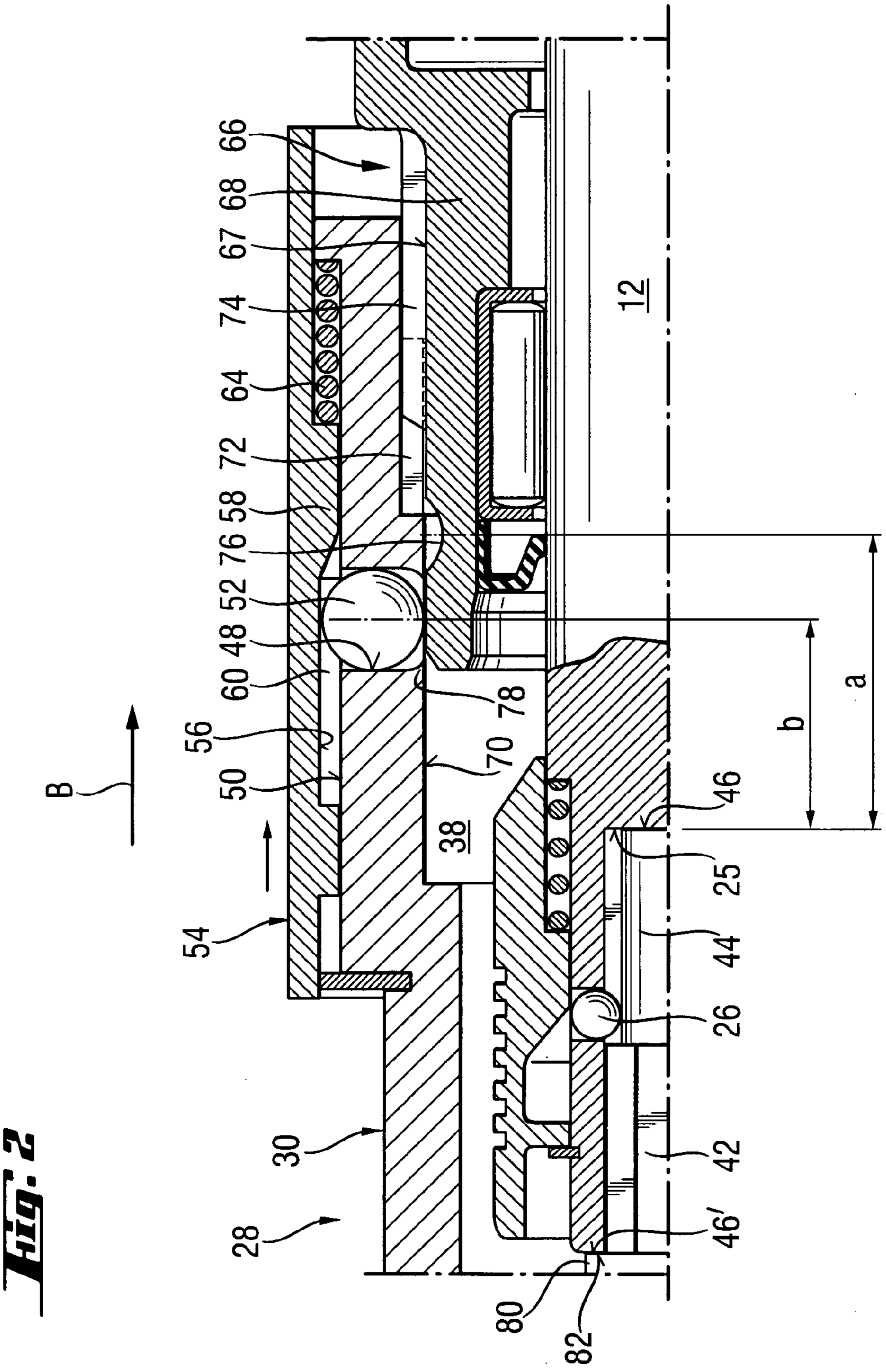
FIG. 2 a longitudinal cross-sectional view through the connection means of the drill adapter-power screwdriver assembly shown in FIG. 1 during mounting of the drill adapter to the screwdriver.

In FIG. 2, a position is shown in which one of the engagement members 52 is still located in a corresponding transverse opening 48, and the adjusting body 58 of the actuation sleeve 54, which serves as locking means of the locking device for securing the drill adapter 28 on the screwdriver 4, lies on the outer circumference 50 of the push-on sleeve 30 when the push-on sleeve 30 is being pushed over the support surface 66, with the actuation sleeve 54 being pushed against the axial spring 54 in the mounting direction B. In this position, the disengagement space 60 is located at the axial height of the transverse opening 48.

As shown in FIG. 2, when the screwdriver neck 68 enters the receiving space 38 of the push-on sleeve 30, the engagement member 52 is pushed into the transverse opening 48 so that it does not project beyond the inner circumference 70 in the receiving space 38 but rather extends beyond the outer circumference 50 into the disengagement space 60, so that the support region 66 of the screwdriver 4 can be pushed into the receiving space 38 without any obstacles.

As further shown in FIG. 2, the transverse openings 48 have, at their end adjacent to the receiving space 38, a minimal narrowing 78 which prevent the engagement member 52 from falling out.

Because the distance a between the annular groove 76 of the neck 68 and the bottom 25 of the tool bit receptacle 24 is greater than distance b between the axial stop 46 and the center of the engagement member 62, upon the push-on sleeve 30 being pushed over the support region 66 of the neck 68, the axial stop 46 abuts the bottom 25 of the bit receptacle 24 and which serves as a counter-stop, before the engagement member 52 reaches the axial height of the annular groove 76. Therefore, the axial stop 46, because of the smaller cross-section of the stop element 44, can be pushed over the locking ball 26 without any hindrance.

Instead of the stop element 44, the axial stop 46 can be formed, as shown in FIG. 2 with the reference numeral 46', by a transverse step 80 that engages an end surface 82 of the spindle 12.

Figure 3:
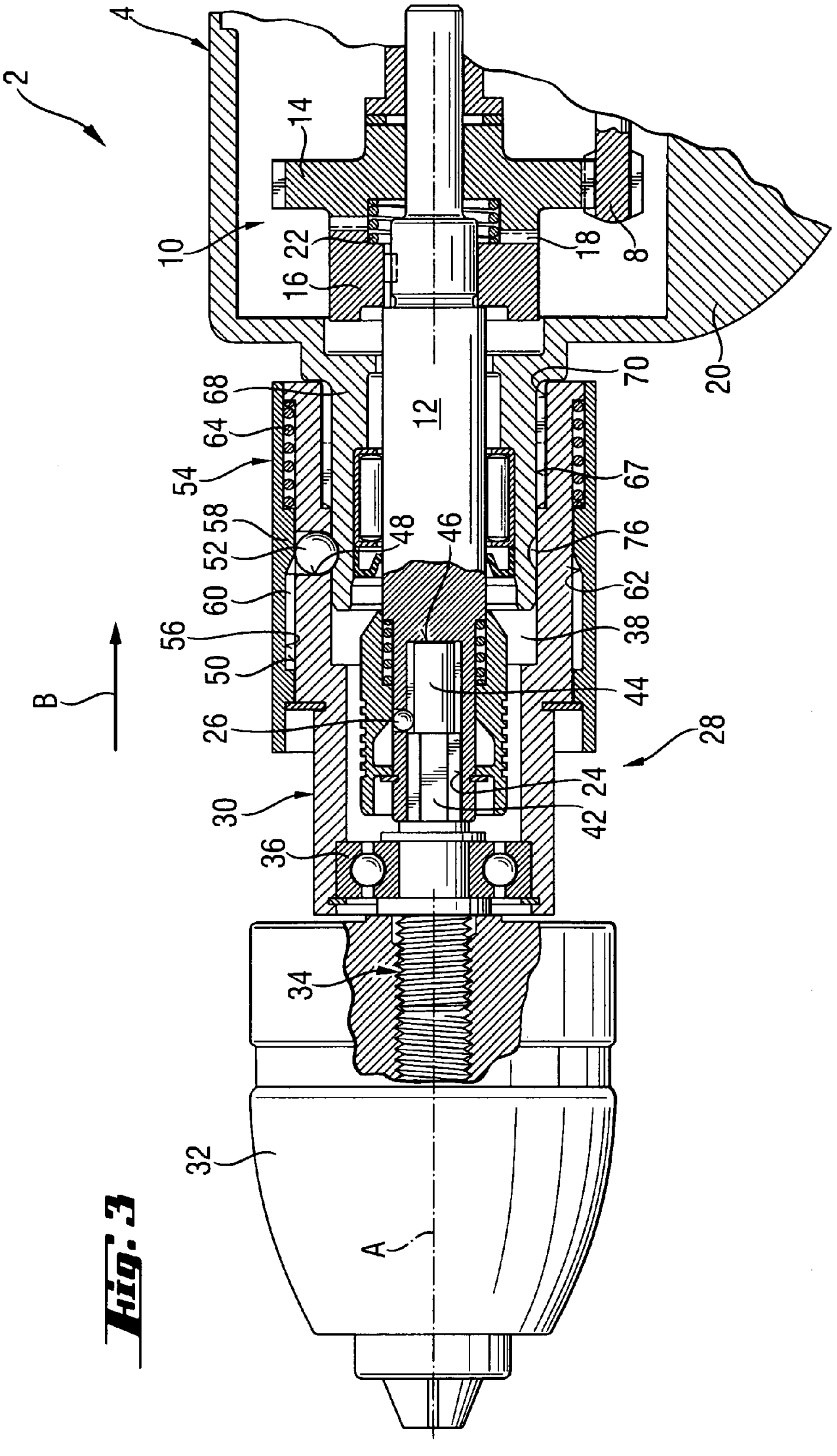
FIG. 3 a longitudinal cross-sectional view of the drill adapter-screwdriver assembly shown in FIG. 1 in a mounted condition of the drill adapter on the screwdriver.

Upon further displacement of the push-on sleeve 30 relative to the support region 66 in the mounting direction B, the axial stop 12 would displace the tool spindle 12 against the biasing force of the spring 22 until the engagement member 52 arrives at an axial height of the annular groove 76 and engages same, as shown in FIG. 3. Only in this position of the tool spindle 12, the drive clutch 10 become engaged. The drive rod 34, thus, serves as an adjusting element for displacing the tool spindle 12 and for actuating the clutch 10.

Upon release of the actuation sleeve 54, the adjusting body 58 will be pressed by the biasing force of the axial spring 64 into the locking position in which the adjusting body 58 abuts an outer end of the transverse opening 48 and lies on the engagement member 52. Thereby, the engagement member 52 and with it, the push-on sleeve 30, the ball bearing 36, the drive rod 34, and the axial stop 46 are held in a formlocking axial engagement with the screwdriver neck 68. Simultaneously, the tool spindle 12 occupies its displaced position, and the drive clutch 10 is in a coupled condition.

In the locking position of the drill adapter 28 on the screwdriver 4, the tool spindle 12 can be directly driven upon switching of the motor 6 on, without application of an external force. Thus, the screwdriver 4 can be used for drilling.

To remove the drill adapter 28 from the screwdriver 4, the actuation sleeve 54 is again displaced in the mounting direction B, with simultaneous pulling of the push-on sleeve 30 in an opposite direction from the screwdriver neck 68. The engagement members 52 are displaced out of engagement with the annular groove 76 of the neck 68 until they project partially in the disengagement space 60, releasing the receiving space 38 so that the neck 68 can be displaced therefrom.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A drill adapter (28) for a power screwdriver (4) having a tool spindle (12), a drive clutch (10) for transmitting torque to the tool spindle (12), and a substantially cylindrical support region (66) provided at a tool-side end of the screwdriver (4) for supporting the drill adapter (28), the drill adapter (28) comprising:

a locking device for releasably securing the drill adapter (28) on the support region (66) of the screwdriver (4) including a push-on sleeve (30) supportable on the support region (66) of the screwdriver (4) and attachment means having a locking position in which the drill adapter (28) is secured on the support region (66), and a release position in which the drill adapter (28) can be mounted on or dismounted from the support region (66), the attachment means having at least one engagement member (52) supported in the push-on sleeve (30);

a drill chuck (32) for receiving a drilling tool and rotatable relative to the locking device;

torque transmitting means for drivingly connecting the drill chuck (32) with the tool spindle (12) of the screwdriver (4); and means for actuating the drive clutch (10) via the tool spindle (12), the actuating means projecting into a receiving space (38), which is partially limited by the push-on sleeve (30) and is open at one side, and having an axial stop (46) for contacting the tool spindle (12), the at least one engagement member (52) projecting, in a locking position of the attachment means, beyond an inner surface (70) of the push-on sleeve (30) for establishing an axial formlocking connection between the push-on sleeve (30) and the support region (66) of the screwdriver (4) and which provides for actuation of the drive clutch (10) with actuation means, wherein the actuating means and the torque transmitting means are formed as a one-piece element in form of a drive rod (34), and wherein the drive rod (34) has a threaded end forming the torque transmitting means and screwable into a threaded opening provided in the drill chuck (32), and a shank (42) forming the actuating means, having a polygon cross-section, and insertable in a bit receptacle (24) of the tool spindle (12) of the screwdriver (4).

2. A drill adapter according to claim 1, wherein the shank (42) has an axially extending stop element (44) having a cross-section which is smaller than the polygon cross-section of the shank (42) and a free end of which forms the axial stop (46).

3. A drill adapter according to claim 1, wherein the drive rod (34) comprises a transverse step (80) provided between the threaded end and the shank and forming the axial stop (46').

4. A drill adapter-power screwdriver assembly (2) comprising:

a power screwdriver including:

a tool spindle (12);

a drive clutch (10) for transmitting torque to the tool spindle (12), and a substantially cylindrical support region (66); and a drill adapter (28) including:

a locking device for releasably securing the drill adapter (28) on the support region (66) of the screwdriver (4) including a push-on sleeve (30) supportable on the support region (66) of the screwdriver (4) and attachment means having a locking position in which the drill adapter (28) is secured on the support region (66), and a release position in which the drill adapter (28) can be mounted on or dismounted from the support region (66), the attachment means having at least one engagement member (52) supported in the push-on sleeve (30), a drill chuck (32) for receiving a drilling tool and rotatable relative to the locking device, torque transmitting means for drivingly connecting the drill chuck (32) with the tool spindle (12) of the screwdriver (4), and means for actuating the drive clutch (10) via the tool spindle (12), the actuating means projecting into a receiving space (38), which is partially limited by the push-on sleeve (30) and is open at one side, and having an axial stop (46) for engaging the tool spindle (12), the at least one engagement member (52) projecting, in a locking position of the attachment means, beyond an inner surface (70) of the push-on sleeve (30) for establishing an axial formiocking connection between the push-on sleeve (30) and the support region (66) of the screwdriver (4) and which provides for actuation of the drive clutch (10) with actuation means, wherein the tool spindle (12) has a counter-stop (25) cooperating with the axial stop (46) of the actuating means, wherein the support region (66) has engagement means for partially receiving the engagement member (52) projecting from the inner surface (70) of the push-on sleeve (30), and wherein an axial distance (a) between the counter-stop and a center of the partially receiving engagement means in an undisplaced position of the tool spindle (12) is greater than the axial distance (b) between the axial stop (46) of the actuating means and a center of the engagement member (52), wherein the axial distance (a) between the counter-stop and the engagement means is about by from 3 mm to 7 mm greater than the axial distance between the axial stop (46) and the at least one engagement member (52).

5. A drill adapter-power screwdriver assembly (2) comprising:

a power screwdriver including:

a tool spindle (12);

a drive clutch (10) for transmitting torque to the tool spindle (12), and a substantially cylindrical support region (66); and a drill adapter (28) including:

a locking device for releasably securing the drill adapter (28) on the support region (66) of the screwdriver (4) including a push-on sleeve (30) supportable on the support region (66) of the screwdriver (4) and attachment means having a locking position in which the drill adapter (28) is secured on the support region (66), and a release position in which the drill adapter (28) can be mounted on or dismounted from the support region (66), the attachment means having at least one engagement member (52) supported in the push-on sleeve (30), a drill chuck (32) for receiving a drilling tool and rotatable relative to the locking device, torque transmitting means for drivingly connecting the drill chuck (32) with the tool spindle (12) of the screwdriver (4), and means for actuating the drive clutch (10) via the tool spindle (12), the actuating means projecting into a receiving space (38), which is partially limited by the push-on sleeve (30) and is open at one side, and having an axial stop (46) for engaging the tool spindle (12), the at least one engagement member (52) projecting, in a locking position of the attachment means, beyond an inner surface (70) of the push-on sleeve (30) for establishing an axial form-locking connection between the push-on sleeve (30) and the support region (66) of the screwdriver (4) and which provides for actuation of the drive clutch (10) with actuation means, wherein the tool spindle (12) has a counter-stop (25) cooperating with the axial stop (46) of the actuating means, wherein the support region (66) has engagement means for partially receiving the engagement member (52) projecting from the inner surface (70) of the push-on sleeve (30), and wherein an axial distance (a) between the counter-stop and a center of the partially receiving engagement means in an undisplaced position of the tool spindle (12) is greater than the axial distance (b) between the axial stop (46) of the actuating means and a center of the engagement member (52), wherein the drive spindle (12) comprises a bit receptacle (24), and wherein the drill adapter comprises a drive rod (34) having a threaded end forming the torque transmitting means and screwable into a threaded opening provided in the drill chuck (32), and a shank (42) forming the actuating means and having a polygon cross-section dimensions and a shape of which is adapted to a receiving cross-section of the bit receptacle (24).

* * * * *